United States Patent Office 2,858,241
Patented Oct. 28, 1958

2,858,241

STEEL SHEET MEMBER COATED WITH ACID-ANHYDRIDE CURED DIMETHYLSILOXANE

Martin P. Seidel and Thomas J. Murrin, Sharon, Pa., assignors to Westinghouse Electric Corporation, East Pittsburgh, Pa., a corporation of Pennsylvania No Drawing. Application December 21, 1953
Serial No. 399,580

1 Claim. (Cl. 117—230)

This invention relates to heat-convertible organopolysiloxane elastomers embodying a novel cross linking agent.

In general, oragnopolysiloxane elastomers comprise a mixture of inorganic pigments, high molecular weight, primarily linear organosilicone gums, and peroxide type catalysts. The gums of higher molecular weight in these mixtures are of such high molecular weight that most of the mixtures are only swelled rather than dispersed by the usual solvents, but the gums with which this invention is particularly concerned are those which can be dispersed in powerful solvents. The final product which is obtained by heating these compounds under carefully controlled conditions is a true elastomer which has the physical properties which are characteristic of natural or synthetic rubber.

Recently, attempts have been made to apply thin insulating films of organopolysiloxane resin elastomers to electrical sheet steel. These elastomers in paste form have been successfully used to provide relatively heavy coatings of 1/16" to 1/2" thickness on electrical sheet steel, but the attempts to apply coatings as a thin film were unsuccessful. The films when applied failed to set properly when heated for periods of from one to thirty minutes at a temperature of from 100 to 200° C. and had very poor adhesion, little resiliency, high surface tack and no solvent resistance. The films could be completely stripped from the steel sheets by means of a single stroke made with the edge of a piece of paper. The surface tack was such that treated sheets adhered both to each other and to bare steel. When a pair of superimposed sheets with a siloxane elastomer between them were separated, the films were essentially destroyed.

An object of this invention is to provide a heat-convertible organopolysiloxane resin with a novel cross linking agent comprising an organo polybasic acid or anhydride.

A further object of this invention is to provide a method of making a cured organopolysiloxane resin which utilizes a novel cross linking agent of an organo polybasic acid or anhydride.

A still further object of this invention is to provide a method of coating a metal surface with an insulation comprising a thin cured organopolysiloxane resinous film which is adherent, tack free, and resilient.

Another object of this invention is to provide for members a novel thin film coating comprising a cured organopolysiloxane resin in which an organo polybasic acid or anhydride is used as a cross linking agent.

Other objects of the invention will, in part, be obvious and will, in part, appear hereinafter.

For a better understanding of the nature and objects of the invention, reference should be had to the following detailed description.

We have discovered that organopolysiloxane elastomers may be applied and cured in thin films on metal surfaces by utilizing an organic polybasic acid or anhydride as a cross linking agent. The organopolysiloxane elastomers to which the cross linking agent of this invention is applicable are those containing more than 1.9 and less than 2.1 organic radicals per silicon atom and preferably from 1.95 to 2.05 hydrocarbon radicals per silicon atom.

The above organopolysiloxanes may be described as heat-convertible polysiloxanes consisting of hydrocarbon radicals and silicon and oxygen atoms having the recurring structural unit

where R and R' are the same or different monovalent hydrocarbon radicals. Preferably R and R' are lower alkyl radicals, more particularly the methyl radical. Examples of other hydrocarbon radicals are aliphatic radicals, for instance, alkyl radicals (e. g., ethyl, propyl, isopropyl, etc.), unsaturated radicals (e. g., vinyl radicals, etc.), acyclic radicals (e. g., cyclopentyl, cyclohexyl, etc.).

Substantially all of the organopolysiloxane elastomers found in commerce contain basically the same methylsilicone polymer. The individual properties of each elastomer are obtained by varying the kind and amount of filler and also the average molecular weight of the gum. The filler generally constitutes approximately 60% by weight of the compounded elastomer. The filler used, however, may be varied in an amount from 1 part by weight filler to 3 parts by weight of siloxane to 3 parts by weight filler to 1 part by weight siloxane.

Suitable fillers include finely divided inorganic materials such as asbestos, clay, finely divided silicon dioxide such as silica soot, fiber glass, iron oxide, bentonite, diatomaceous earth, precipitated calcium carbonate, alumina, zinc oxide, magnesia, titania and zirconia. The low temperature behavior of the elastomers of this invention is unaffected by the type or amount of filler employed.

The novel cross linking agent employed in this invention may be an organic polybasic acid or anhydride such as maleic anhydride, phthalic anhydride, malonic acid, adipic acid, succinnic acid, glutaric acid, terephthalic acid, pyromellitic acid and the like.

The amount of organo polybasic acid or anhyride admixed with the organopolysiloxane resin may be from 0.25 to 10% by weight, based on the weight of the organopolysiloxane resin. Good results have been obtained with the dibasic acid anhydride being used at a concentration of about 1.0% by weight, based on the weight of the organopolysiloxane resin.

Before applying an organopolysiloxane elastomer to the surface of a metal member such as electrical sheet steel, the siloxane is first dispersed in a suitable solvent such as acetone, carbon tetrachloride, toluene, and the like. The elastomers are diluted to form dispersions having resin solids content of from 25 to 75% by weight and are then ready for immediate use or if desired, they may be allowed to stand.

The resinous solution is applied to members by any suitable means such as dipping, spraying, flowing, etc. The applied solution is then cured to form a tough resilient film of from 0.0003 to 0.01 inch thickness by heating at a temperature of from 100 to 200° C. for a period of time from 1 to 30 minutes. For general purposes, however, such as coating electrical sheet steel, a coating having a thickness of from 0.0003 to 0.0025 inch is desirable. It is to be understood of course that the coating of this invention may be applied to other surfaces such as, for example, porcelain enamel, glass, aluminum, copper and various plastics such as polymeric monochlorotrifluoroethylene polymers, etc.

Example 1

The following example is illustrative of the practice of this invention:

A paste comprising a low molecular weight dimethyl silicone elastomer was diluted with equal parts of toluene and acetone to form a 50% by weight resin solids dispersion. Maleic anhydride was admixed with the solution in an amount of 0.5% by weight based on the weight of the paste. An electrical sheet steel member was dipped in the liquid dispersion to provide a coating thereon. The coated member was heated in an oven for a period of 15 minutes, at a temperature of 150° C. The applied dimethyl silicone cured to form an elastomer film having a thickness of 0.001". The cured film had very little surface tack, good adhesion to the steel and had a high degree of resilience. The physical properties of the film were comparable with those of organopolysiloxane elastomers formed in thick sections.

Since certain obvious changes may be made in the specification, and different embodiments of the invention may be made without departing from the spirit and scope thereof, it is intended that all matter contained in the foregoing description shall be interpreted as illustrative and not in a limiting sense.

We claim as our invention:

An electrical sheet steel member coated with a cured insulating elastomeric organopolysiloxane film having a thickness of from 0.0003 to 0.01 inch, the film being derived by (1) coating the sheet metal member with a composition obtained by reacting in a liquid dispersant as essential components (a) a paste comprising dimethylsiloxane containing more than 1.9 and less than 2.1 methyl radicals per silicon atom, the methyl radicals being attached to the silicon atoms of the dimethyl-siloxane by carbon-silicon linkages, and (b) a cross linking agent for the dimethylsiloxane comprising a dicarboxylic acid anhydride selected from the group consisting of maleic anhydride, and phthalic anhydride, the dicarboxylic acid anhydride being present in an amount of from 0.25% to 10% by weight, based on the weight of the dimethylsiloxane, and (c) up to 75%, based on the weight of the dimethylsiloxane resin, of a finely divided filler, and (2) thereafter heating the coating until the composition cures to a highly adherent elastomeric film.

References Cited in the file of this patent

UNITED STATES PATENTS

| | | |
|---|---|---|
| 2,467,976 | Hyde | Apr. 19, 1949 |
| 2,500,843 | MacKenzie et al. | Mar. 14, 1950 |
| 2,595,779 | Dudley | May 6, 1952 |